(12) United States Patent
Kluge (10) Patent No.: US 12,361,253 B2
(45) Date of Patent: Jul. 15, 2025

(54) DATA-BEARING CARD AND SEMI-FINISHED PRODUCT AND WIRING LAYOUT FOR SAME, AND METHOD FOR PRODUCING SAME

(71) Applicant: GIESECKE+DEVRIENT EPAYMENTS GMBH, Munich (DE)

(72) Inventor: Stefan Kluge, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/559,121

(22) PCT Filed: Apr. 28, 2022

(86) PCT No.: PCT/EP2022/061403
§ 371 (c)(1),
(2) Date: Nov. 6, 2023

(87) PCT Pub. No.: WO2022/233716
PCT Pub. Date: Nov. 10, 2022

(65) Prior Publication Data
US 2024/0242054 A1    Jul. 18, 2024

(30) Foreign Application Priority Data

May 4, 2021   (DE) ...................... 10 2021 111 570.1
Apr. 20, 2022  (DE) ...................... 10 2022 109 547.9

(51) Int. Cl.
*G06K 19/077*   (2006.01)

(52) U.S. Cl.
CPC ............................... *G06K 19/0772* (2013.01)

(58) Field of Classification Search
None
See application file for complete search history.

(56) References Cited

U.S. PATENT DOCUMENTS

2015/0161501 A1   6/2015   Krull et al.
2016/0224882 A1   8/2016   Zhang

FOREIGN PATENT DOCUMENTS

| CN | 102629337 A | 8/2012 | |
|---|---|---|---|
| DE | 10258801 A1 | 7/2004 | |
| DE | 102012211546 A1 | 1/2014 | |
| EP | 3159832 A1 * | 4/2017 | ............. G06K 19/07 |

OTHER PUBLICATIONS

International Search Report from corresponding PCT Application No. PCT/EP2022/061403, Aug. 5, 2022.

* cited by examiner

*Primary Examiner* — Kristy A Haupt
(74) *Attorney, Agent, or Firm* — Workman Nydegger (57) ABSTRACT

Electronic components of a chip card are connected to one another in an electrically conducting manner and include two contact terminals of one of the two electronic components being connected to one another in an electrically conducting manner either directly or by way of associated contact pads in the card body.

41 Claims, 5 Drawing Sheets

DATA-BEARING CARD AND SEMI-FINISHED PRODUCT AND WIRING LAYOUT FOR SAME, AND METHOD FOR PRODUCING SAME

BACKGROUND

The invention relates generally to the field of electronic data carriers as data-bearing cards, in particular chip cards, such as for example credit cards and debit cards, and especially such data carriers that have two electronic components, which are arranged separately in the data card but are electrically connected to one another. In this conjunction, the invention relates to the data carriers as such as well as to semi-finished products and wiring layouts for same, and to methods for producing same.

It is known in conjunction with contactlessly communicating chip cards to provide the electronic chip ("microchip") of the chip card with an antenna device arranged inside the chip card. For this purpose, the antenna device, for example in the form of a coil, is laid on a layer lying inside the card, the so-called card inlay, and has two contact pads, which are connected in an electrically conducting manner to two corresponding contact areas on the underside of a chip module containing the chip. There are various technical solutions for producing the contact between the contact pads of the antenna coil and the contact areas of the chip module. Many of the solutions have in common that the card inlay is laminated with one or more further layers, so that the surface of the card layer carrying the antenna device lies inside the card. Subsequently, a cavity, into which the chip module is inserted, is milled into the card body. This is the case in particular with so-called dual-interface cards, in which the chip can communicate both in a contactless manner by way of the antenna device and in a contact-based manner by way of further exposed contact areas of the chip module. When creating the cavity, the terminal pads of the antenna coil are also exposed. Serving as the connection between the contact pads of the antenna coil and the contact areas of the chip module lying above them may be a silicone compound with metallic particles, which remains elastic after curing and as a result forms a reliable connection with the contact areas of the chip module placed onto the silicone compound from above (so-called flex-bump technology). According to an alternative method, instead of the silicone compound, an electrically conducting solder paste is applied to the respective contact pad of the antenna device and is liquefied in a local melting process, so that it produces a reliable electrically conducting connection with the contact areas of the chip module that becomes permanent by cooling down of the solder (for example by so-called TeConnect methods from Mühlbauer). According to a third method, the contact pads of the antenna device are provided with an anisotropic conductive film (ACF). This is a hot-meltable plastics material with conductive particles distributed in it, which only electrically conducts perpendicularly to the contact pad, so that the film can be applied over a relatively large surface area, even over a plurality of contact pads, without electrically short-circuiting these contact pads (so-called ACF connection technique).

Instead of the antenna device or often in addition to it, an electronic data-bearing card may have further electronic components, in particular sensors such as for example a fingerprint sensor. Such sensors may serve for the identification of an authorized user and for enabling the cards. Like the antenna coil, they must also be connected to the chip of the chip card in an electrically conducting manner in order to be able to communicate with the chip. This can take place in the same way as explained above with reference to the antenna device.

Therefore, one or more first contact pads of the card inlay for contacting a first electronic component are to be connected in an electrically conducting manner to one or more second contact pads for contacting a second electronic component. Instead of providing in each case full-area contact pads, which are individually connected to one another by means of separate lines, to reduce the production expenditure the contact pads and the electrically conducting connections between the contact pads are produced by one and the same wire, in that the wire concerned is laid in a meandering or zigzag form on the card inlay in the region of the contact pads such that the contact pad is covered by the wire sufficiently densely that contacting from above can reliably take place. The wire is in this case laid in an ultrasonically assisted manner, so that it digs itself into the surface of the card inlay and does not influence the thickness of the card body. The wire itself is usually plastic-coated, the plastic coating being removed in the region of the contact pads during milling free.

Proceeding from this prior art, the problem arises that in some applications two or more contact terminals of an electronic component must be electrically short-circuited with one another and at the same time the connection to a contact terminal of the other electronic component must be created. Replacing the contact pads of a zigzag form of the card inlay associated with the two contact terminals of the one electronic component by a single large contact pad of a zigzag form or producing two contact pads of a zigzag form and a connecting line lying in between by means of a wire can lead to problems, because it can happen as a result of production tolerances that, during the milling of the cavity for the electronic component that is to be inserted, the contact pads are milled into laterally. The wire is then severed, and consequently so too is the electrically conducting connection between the two contact pads.

SUMMARY

The object of the present invention is therefore to provide a solution in this context as to how, in a data-bearing card with a plurality of electronic components connected to one another in an electrically conducting manner, to be able to connect two contact areas of one of these two components and a contact pad of the other component to one another in an electrically conducting manner in a reliable way.

According to the present disclosure, a wiring layout of a corresponding multilayered data-bearing card has a first contact pad for connecting a first electronic component and preferably at least two second contact pads for connecting a second electronic component as well as electrically conducting connections on the one hand between the first contact pad and a first of the second contact pads and on the other hand between the first of the second contact pads and a second of the second contact pads. In this case, said contact pads are respectively formed by a wire running in a meandering form and are also referred to below as wire pads.

According to a first aspect of the present disclosure, a continuous wire, which forms both said contact pads and the electrically conducting connection, is used in this case. This wire is laid in the first of the second contact areas as a double meander, to be specific preferably such that a first part of the wire forms first meander loops arranged in series next to one another in a first direction and an adjoining second part of the continuous wire forms second meander loops arranged in series next to one another in an opposite running-through direction, the first and second meander loops being nested in one another. The interengaging back-and-forth progression of the wire laid in the manner of a double meander forms an "interdigital structure". By means of the double meander, it is possible for the wire to proceed in the wire path in such a way that the end of the wire running into the contact pad and the end of the wire leading out of the contact pad lie at the same end of the contact pad. When the contact pad is then arranged in the card body such that the correspondingly opposite end of the contact pad is facing the cavity to be milled out, it does not harm the electrical connection between the first and the second contact pad when the contact pad in the form of a double meander is milled into during the milling out of the cavity. This is so because the fact that, when the contact pad laid in the manner of a double meander is contacted with an associated contact area of the (second) electronic component, an electrical connection between the end of the wire leading into the contact pad and the end of the wire leading out of the contact pad is always also produced means that an interruption of the wire in the region of the contact pad is uncritical.

A corresponding method for producing this wiring layout accordingly comprises the following steps:
providing a plastic substrate and
laying a continuous wire on the plastic substrate to create at least one first contact pad for connecting a first electronic component and at least two second contact pads for connecting a second electronic component, the wire being laid in said contact pads in a meandering form in each case, and to create an electrically conducting connection between the first contact pad and a first of the second contact pads on the one hand and between the first of the second contact pads and a second of the second contact pads on the other hand, the continuous wire being laid in the first of the second contact areas as a double meander, to be specific preferably such that a first part of the continuous wire forms first meander loops arranged in series next to one another in a first direction and an adjoining second part of the continuous wire forms second meander loops arranged in series next to one another in an opposite running-through direction, the first and second meander loops being nested in one another.

In the sense of this variant of an embodiment, the "continuous wire" should also be understood as a continuous wire if the wire is interrupted between the first part, forming the first meander loops, and the second part, forming the second meander loops, of the wire, since—as explained below—the wire is in any case separated at this point in a later method step.

According to a second aspect of the present disclosure, the contact pads for connecting the first and second electronic components as well as the electrically conducting connections between the contact pads are formed by two continuous wires. The first continuous wire forms the (at least one) first contact pad for the first electronic component and the first of the (at least two) two contact pads for the second electronic component as well as a connecting line between these two contact pads. The second wire forms the second of the second contact pads and a connection line led out from it. Additionally provided is an electrically conducting connecting element, which "overlies" the connection line formed by the first wire and the connection line formed by the second wire and connects them to one another in an electrically conducting manner. In this case, the electrically conducting connecting element may cover the region of the connecting line of the first continuous wire and the region of the connection line of the second continuous wire from above. Alternatively, the electrically conducting connecting element may first be provided on the card inlay and both the laying of the first continuous wire in the region of the connecting line and the laying of the second continuous wire in the region of the connection line may respectively take place over the electrically conducting connecting element, so that the electrically conducting connecting element lies under the continuous wire and the connection line.

Preferably, the electrically conducting connecting element is in this case metallic, in particular copper, and the electrically conducting connection between the electrically conducting connecting element and the connecting line of the first continuous wire on the one hand and between the electrically conducting connecting element and the connection line of the second continuous wire on the other hand is a welded connection. The welded connection is in turn preferably a thermocompression welded connection, in which metal is welded on metal, in that the metallic electrically conducting connecting element is respectively welded to the relevant wire. The thermocompression welding in turn preferably takes place in an ultrasonically assisted manner. In this case, both any plastic sheathing of the wires and any oxide layer of the metallic electrically conducting connecting element are abrasively removed before the elements are finally welded to one another.

It is particularly preferred in this conjunction if the region of the connecting line of the first continuous wire and the region of the connection line of the second continuous wire that are to be connected to one another by means of the electrically conducting connecting element lie so close together that the electrically conducting connection between the connecting element and the connecting line on the one hand and between the connecting element and the connection line on the other hand can be formed as a common connecting point, in particular as a continuous welded connection, which can advantageously be created in a single process step, for example by thermocompression welding.

Preferably serving as a connecting element is a thin copper element or some other electrically conducting element, particularly preferably a metallized film, for example a PVC film or some other suitable plastic film.

A corresponding method for producing the wiring layouts described above may comprise the following steps:
providing a plastic substrate,
laying a first continuous wire on the plastic substrate to create at least one first contact pad for connecting a first electronic component and a first of at least two second contact pads for connecting a second electronic component and to create a connecting line between these two contact pads, the first continuous wire being laid in said contact pads in a meandering form in each case,
laying a second continuous wire on the plastic substrate to create a second of the second contact pads and a connection line leading out of it, the second continuous wire being laid in the second of the second contact pads in a meandering form,
applying an electrically conducting connecting element either in such a way that it covers both a region of the connecting line of the first continuous wire and a region of the connection line of the second continuous wire or in such a way that both the laying of the first continuous wire in the region of the connecting line and the laying of the second continuous wire in the region of the connection line only take place after applying the electrically conducting connecting element and respectively over the electrically conducting connecting element, and connecting the electrically conducting connecting element in an electrically conducting manner both to the first continuous wire in the region of the connecting line and to the second continuous wire in the region of the connection line.

A third aspect of the present disclosure also provides that the contact pads and the electrically conducting connections between them are created by means of two continuous wires. In just the same way as in the case of the second aspect described above, the first continuous wire forms the (at least one) first contact pad for the first electronic component and the first of the (at least two) second contact pads for the second electronic component as well as a connecting line between these two contact pads. And in just the same way as in the case of the second aspect, the second wire forms the second of the second contact pads and a connection line led out from it. Unlike in the case of the second aspect, however, the electrically conducting connection is not produced by means of an additional electrically conducting connecting element, but instead the first continuous wire forms an additional meandering contact pad in a region of its connecting line, and this additional meandering contact pad overlaps with the connection line formed by the second wire. The electrically conducting connection between the second wire and the first wire in the region of the additional meandering contact pad is again preferably a thermocompression welded connection, in which the wires are directly welded to one another, possibly once again in an ultrasonically assisted manner.

In order to reduce the visibility of the additional contact pad in the finished card, the additional contact pad is preferably shifted toward the adjacent contact pad for the second electronic component or toward the adjacent contact pad for the first electronic component, so that these two contact pads together form one large contact pad, which is preferably at least 50% larger than a normal contact pad, in particular than the other contact pad for the second electronic component or than one other contact pad or all of the other contact pads for the first electronic component. It is of advantage in this conjunction if the enlargement of the relevant contact pad formed by the additional meandering contact pad extends in a direction away from the attachment location of the associated electronic component. This ensures that the additional meandering contact pad is not damaged during the creation of the cavity for the electronic component.

A corresponding method for producing the wiring layout described above may comprise the following steps:

providing a plastic substrate, laying a first continuous wire on the plastic substrate to create at least one first contact pad for connecting a first electronic component and a first of at least two second contact pads for connecting a second electronic component and to create a connecting line between these two contact pads, the first continuous wire being laid in said contact pads in a meandering form in each case and forming an additional meandering contact pad in a region of the connecting line, laying a second continuous wire on the plastic substrate to create a second of the second contact pads and a connection line leading out of it, the second continuous wire being laid in the second of the second contact pads in a meandering form, and the first and the second continuous wire being laid such that the connection line formed by the second continuous wire and the additional meandering contact pad formed by the first continuous wire overlap one another, and connecting the connection line formed by the second continuous wire and the additional meandering contact pad formed by the first continuous wire in an electrically conducting manner in the overlapping region.

Alternatively, it is also possible for the additional wire pad to be omitted and the connection line to be overlaid directly the first of the second contact pads or the at least one first contact pad, and for the electrically conducting connection to take place in the overlaying region.

According to a fourth aspect of the present disclosure, the electrically conducting connection between the two contact pads for the second electronic component is formed by an electrically conducting solder material, which preferably connects these two contact pads to one another in a direct line.

This is particularly appropriate for the production of such data-bearing cards by the TeConnect method mentioned at the beginning or similar methods in which an electrically conducting solder material, in particular a solder paste, is used in any case for connecting the contact pads on the card inlay to the corresponding contact areas on the associated electronic components. Then, the electrically conducting connection between individual contact pads for one of these electronic components can be created on the card inlay at the same time as when the solder material for the connection of the card-inlay contact pads to the contact areas of the electronic components is also applied.

A corresponding method for producing the wiring layout described above may comprise the following steps:

providing a plastic substrate, laying a first continuous wire on the plastic substrate to create at least one first contact pad for connecting a first electronic component and a first of at least two second contact pads for connecting a second electronic component and to create a connecting line between these two contact pads, the first continuous wire being laid in said contact pads in a meandering form in each case.

laying a second continuous wire on the plastic substrate to create a second of the second contact pads, the second continuous wire being laid in the second of the second contact pads in a meandering form, creating an electrically conducting connection between the first of the second contact pads and the second of the second contact pads, in that a line of an electrically conducting solder material, in particular a solder paste, directly connecting these two contact pads is applied.

According to a fifth aspect of the present disclosure, it is not that two contact pads for the second electronic component are connected to one another in an electrically conducting manner, but instead two contact areas of the electronic component itself are connected in an electrically conducting manner. The wiring layout on the card inlay once again comprises for this purpose a first contact pad for connecting a first electronic component and at least one second contact pad for connecting a second electronic component as well as an electrically conducting connection between the first contact pad and the second contact pad. Said contact pads are preferably again respectively formed by a wire running in a meandering form. The second electronic component has at least two contact areas, which are to be short-circuited. For this purpose, an electrically conducting connection between the two contact areas of the second electronic component is provided by means of an electrically conducting material, which has been applied to the two contact areas and connects them directly to one another. The electrically conducting connection is therefore already provided on the relevant electronic component before it is inserted into the card body, and is not created on the card inlay.

This fifth aspect of the present disclosure is suitable in particular for the production of cards in which the contacting between the contact pads on the card inlay and the associated contact areas of the electronic components takes place by means of an anisotropic conductive film (ACF connection technique). The electrically conducting material that directly connects the two contact areas of the second electronic component is preferably a wire, preferably an uninsulated wire, or alternatively a line of isotropically conductive paste, which possibly has to cure, or a line of an isotropically conductive plastic. The latter alternatives have the advantage that they have smaller effects on the thickness of the card body to be produced.

The result is in each case a semi-finished product which comprises the wiring layout and at least the second electronic component, which are preferably connected to one another in an electrically conducting manner by means of an ACF film.

A method for producing the semi-finished product described above according to the fifth aspect of the present disclosure may comprise the following steps:
providing a plastic substrate,
laying a continuous wire on the plastic substrate to create at least one first contact pad for connecting a first electronic component and a second contact pad for connecting a second electronic component and to create a connecting line between these two contact pads, the continuous wire preferably being laid in said contact pads in a meandering form in each case, and the second electronic component having at least two contact areas, and
creating an electrically conducting connection between the two contact areas of the second electronic component by applying to the two contact areas of the second electronic component an electrically conducting material, which connects them directly to one another.

In all of the embodiments, the wiring layout or the surface of the plastic layer on which the wiring layout is provided ends up as a card inlay lying inside the final multilayered data-bearing card. For this purpose, the card inlay layer is laminated with further layers, to be specific at least one artwork layer, which covers the wiring layout and is printed or in some other way provided with a design and information, and, if the rear side of the card inlay layer is provided with a similar design or information, preferably a corresponding artwork layer on the rear side of the card inlay layer. There may possibly also be provided over that in each case a transparent protective layer, either as a transparent film or as a transparent protective varnish, in order in this way to form altogether the multilayered card body for the data-bearing card, in which the wiring layout and the electronic components that are thereby electrically connected to one another are integrated.

The methods described above are also suitable for producing corresponding multiple-repeat sheets for producing a greater number, for example 24 or 48, of data-bearing cards. In conjunction with the second aspect described above, in which two wires are connected by means of an electrically conducting connecting element, in a corresponding multiple-repeat sheet a corresponding multiplicity of regions of a multiple-repeat sheet, for example a PVC film, may be coated with a suitable metal, in particular copper, to be specific at least one such metallically coated region per card of the multiple-repeat sheet.

Further advantages, features and details emerge from the following description of preferred embodiments and on the basis of the drawings, in which:

DETAILED DESCRIPTION OF VARIOUS EMBODIMENTS

Figure 1:
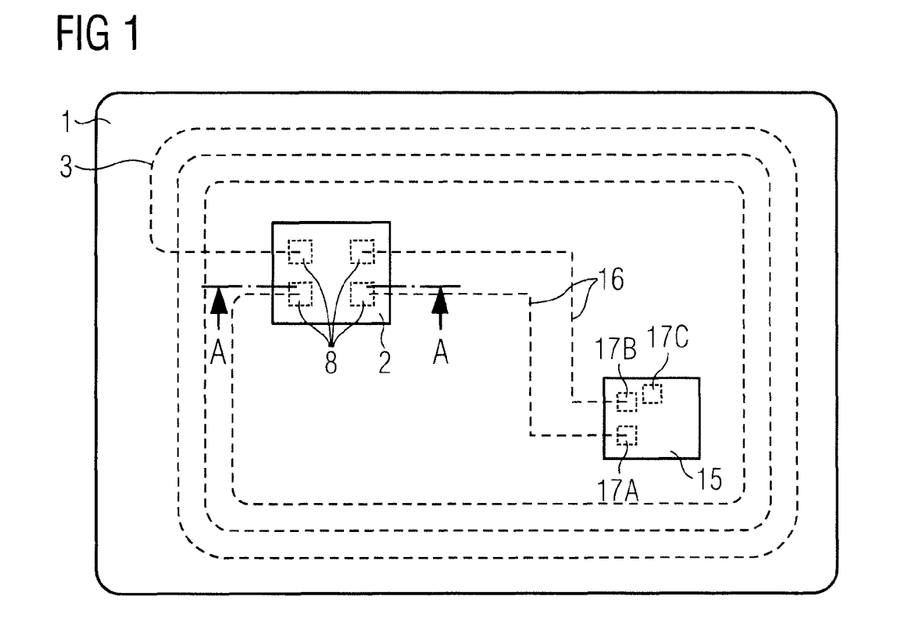
FIG. 1 shows a chip card schematically in plan view.

The following explanation with reference to the accompanying drawings concerns the production of data carriers as data-bearing cards, in particular multilayered data-bearing cards, with at least two electronic components, for example a chip card with a conventional chip and one or more electronic components, such as for example a fingerprint sensor or an iris sensor or other sensors for authenticating a card user. In this context, FIG. 1 shows such a data carrier schematically in plan view. The card body 1 of this chip card contains a coil element 3, which serves as a transmitting and receiving antenna for an integrated circuit of a chip module 2 that is not shown in the figures. In the exemplary embodiment shown in FIG. 1, the coil element 3 is completely embedded in the card body. To illustrate the position of the coil element 3 in the card body, the coil element 3 is schematically shown in FIG. 1 by a dashed line. The chip module 2 is inserted in a recess of the card body and electrically connected to the coil element 3 by way of contact areas 8, which are provided on the underside of the chip module 2. Instead of the coil element 3, a capacitive coupling area or some other transmission element may also be provided instead of the coil element 3.

Figure 2A:
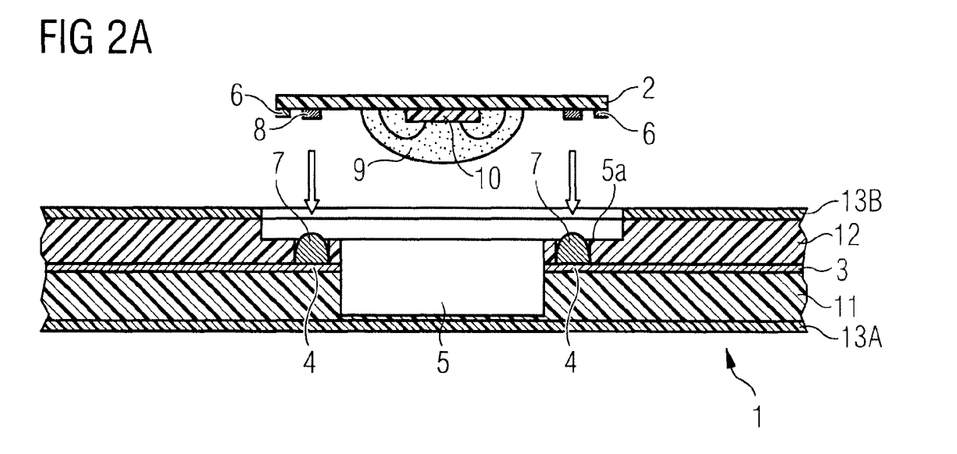
FIG. 2A shows a sectional representation of the chip card shown in FIG. 1 (for example for TeConnect or flex-bump)

FIG. 2A shows the chip card shown in FIG. 1 in a sectional representation during the insertion of the chip module 2 into a two-stage cavity 5 of the card body 1. The section was taken along the line A-B depicted in FIG. 1. For better illustration of the details, the chip card is not shown in its entirety, but only an enlarged excerpt of the chip card. The card body 1 is of a multilayered structure and comprises at least one card inlay 11 with the coil element 3, including contact pads 4, arranged on it, a top layer 12, which may be formed as an artwork layer and is accordingly printed for example on its upper side, as well as optionally transparent protective layers 13A, 13B, which here form the external layers of the card body. The protective layers 13A, 13B may be provided as a varnish layer or as a film. The inlay layer 11 may be configured on the rear side in just the same way as the top layer 12 as an artwork layer, or an additional artwork layer may be provided between the inlay layer 11 and the lower protective layer 13A. The film layers 11 and 12 may for their part consist of a plurality of individual film layers.

Milled in the card body 1 is a two-stage recess 5, which has a shoulder region 5a, into which the chip module 2 is inserted from above. In this case, the chip module 2 is typically fitted, within the applicable technical tolerances, into the recess 5 such that the surface of the chip module 2 is in line with the surface of the card body 1 and the contact areas 8 on the underside of the chip module 2 come to lie opposite the contact pads 4 of the coil element 3 that have been exposed by milling and thereby partially removed. The recess 5 is dimensioned such that it can receive the chip module 2 together with a potting compound 9, which surrounds an integrated circuit 10. The mechanical connection between the chip module 2 and the card body 1 may be produced for example with the aid of a thermo-activatable adhesive 6, which is for example applied to the underside of the chip module 2 alongside the contact areas 8.

The electrical connection between the chip module 2 and the coil element 3 contained in the card body 1 may take place by means of a conductive elastomer 7 (for example flex-bump from Mühlbauer), which has been applied to the contact pads 4 of the coil element 3.

The conductive elastomer is preferably a silicone compound with metallic particles, which remains elastic after curing and as a result forms a reliable electrically conducting connection with the contact areas 8 of the chip module 2 lying on the silicone compound from above (so-called flex-bump technology).

Instead of the silicone compound, an electrically conducting solder paste may be applied to the respective contact pad 4 of the coil element 3 and liquefied in a local melting process, so that the solder paste produces a reliable electrically conducting connection with the contact areas 8 of the chip module 2 that becomes permanent by cooling down of the solder (TeConnect method).

Figure 2B:
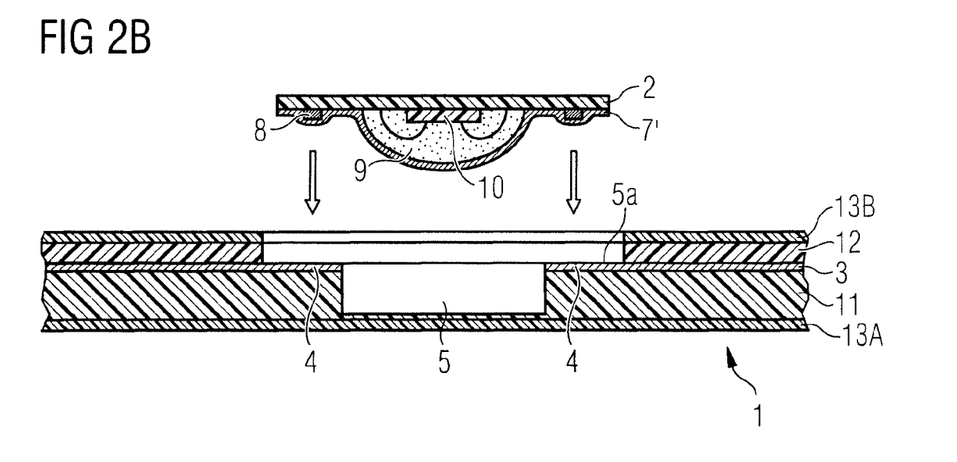
FIG. 2B shows a sectional representation of the chip card shown in FIG. 1 (for example for ACF)

According to a further alternative method, the contact pads 4 of the coil element 3 are provided with an anisotropic conductive film 7' (ACF film). The corresponding card structure is shown in FIG. 2B. Here, the depression is milled away to the wire plane 3. The ACF film 7' is a hot-meltable plastics material with conductive particles distributed in it, whereby the film only electrically conducts perpendicularly to the contact pad 4, so that the film can be applied over a large surface area, even over a plurality of contact pads 4, without electrically short-circuiting these contact pads 4. The ACF film 7' is typically applied over the surface area on the underside of the chip module.

It is however of particular significance for the present disclosure that not just one electronic component, such as for example the chip module 2, is provided in the card body 1 of the data-bearing card, but also a further electronic component 15, such as for example a fingerprint sensor. The second electronic component may be integrated into the card body in the same way as explained above in conjunction with the chip module 2 with reference to FIG. 2A or FIG. 2B. To this extent, FIG. 1 shows two contact areas 17A, 17B of the second electronic component 15, which are respectively connected to one of the contact areas 8 by way of electrically conducting connections 16.

FIG. 1 additionally shows a further contact area 17C on the underside of the second electronic component 15, corresponding to the contact areas 8 of the chip module 2 in FIG. 2A. In the various aspects described below, the concern is to produce an electrically conducting connection between the contact areas 17B and 17C of the second electronic component 15. All of the exemplary embodiments described below have in common here that the wiring layout on the inlay layer 11 is formed by wires which are embedded in the surface of the inlay layer 11. For this purpose, the wire is laid on the inlay layer and at the same time subjected to ultrasound, so that, as a result of the vibrations generated, it digs itself into the surface. Contact pads of the wiring layout are in this case produced by meandering or zigzag-like laying of the wire, and also the electrically conducting connections 16 between the contact pads are in this case formed by the wire from which the pads have also been created.

Figure 3:
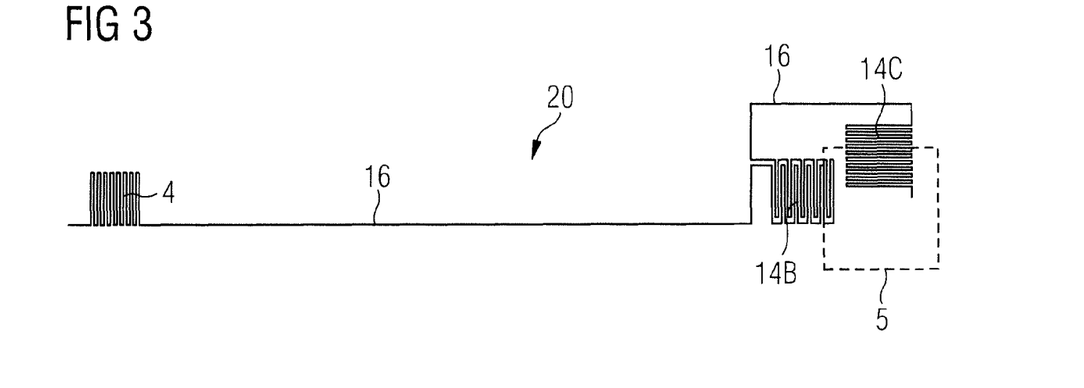
FIG. 3 shows a wiring layout according to a first aspect of the disclosure.

A first aspect of the present disclosure is explained below on the basis of FIG. 3, which schematically shows in plan view part of a wiring layout 20 created on the inlay layer 11. This part of the wiring layout 20 comprises on the one hand two contact pads 4 and 14B, which are electrically connected by means of the connecting line 16 and are formed by a continuous wire, the wire running in a meandering form in the region of the contact pads 4 and 14B. Additionally present is a third contact pad 14C, which serves for contacting the contact area 17C of the second electronic component 15 that is shown in FIG. 1. The same wire with which the contact pads 4, 14B and the electrically conducting connection 16 are formed leads out of the contact pad 14B to the contact pad 14C and is likewise laid in a meandering form there, in order to form the contact pad 14C. Consequently, all of the contact pads 4, 14B, 14C and the connecting lines 16 are formed by one continuous wire. What is special about this aspect of the present disclosure is on the one hand that the wire is on the one hand laid in the region of the contact pad 14B as a double meander and on the other hand preferably leads out of that side of the contact pad 14B where the connecting line 16 leads into the contact pad 14B. The contact pads 14B and 14C lie in the shoulder region 5a of the two-stage recess 5 shown in FIG. 2B. It can happen during the milling out of the two-stage depression, in particular in the case of tolerance deviations in the production of the card, that the lower-lying part of the two-stage recess 5, which is indicated in FIG. 3 by a bordering shown in dashed lines, mills away part of the contact pad 14B. The wire is indeed severed in this case in the region of the contact pad 14B, and initially no longer conducts further to the other contact pad 14C. If, however, subsequently during the insertion of the electronic component 15, this contact pad 14B is connected to an associated contact area 17B of the electronic component 15, for example by means of an electrically conductive adhesive or solder or by way of an electrically conducting ACF film, the meander loops nested in one another of the wire laid as a double meander are short-circuited, so that also an electrically conducting connection with the contact pad 14C is produced again.

As shown in FIG. 3, the double meander is preferably laid such that a first part of the continuous wire forms first meander loops arranged in series next to one another in a first direction and an adjoining second part of the continuous wire forms second meander loops arranged in series next to one another in an opposite running-through direction, so that the first and second meander loops are nested in one another. The connections 16 with the contact pads 4 and 14C preferably enter the contact pad 14B at points that are as far away as possible from the recess 5, preferably on the side of the contact pad 14B that is facing away from the recess 5.

Figure 4:
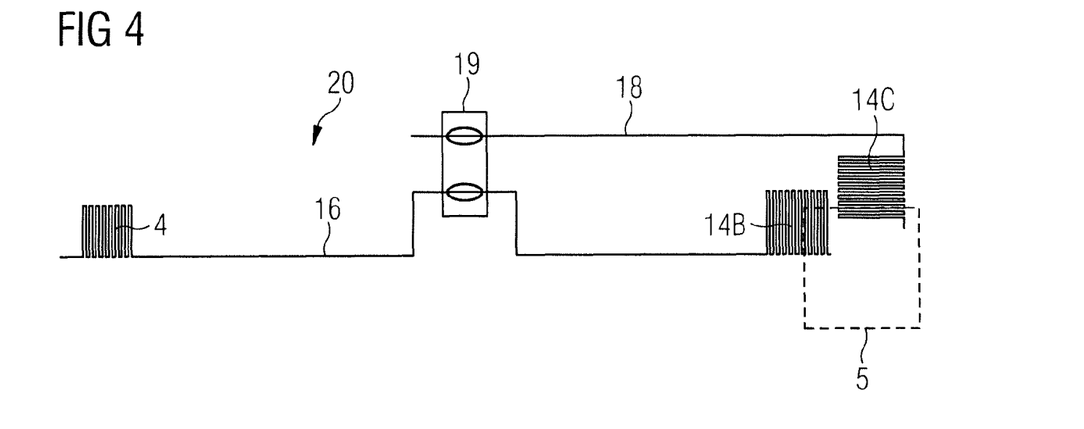
FIGS. 4 and 5 show two variants of a wiring layout according to a second aspect of the present disclosure.
Figure 5:
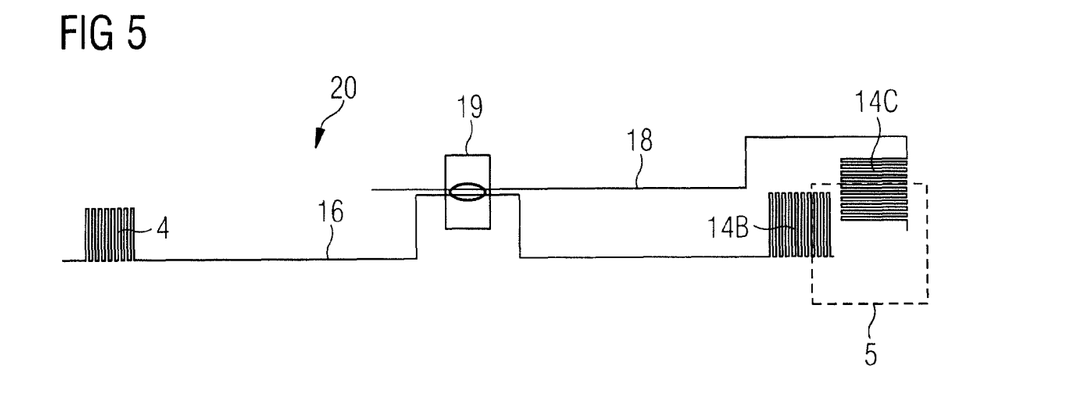

A second aspect of the present disclosure is explained below on the basis of FIGS. 4 and 5, which respectively show again in a schematic plan view part of a wiring layout 20 created on the inlay layer 11. Also in this case, the wiring layout comprises a first contact pad 4 for connecting a first electronic component, for example of the chip module 2, and at least two contact pads 14B, 14C for connecting the second electronic component 15 as well as an electrically conducting connection 16 between the first contact pad 4 and the first of the second contact pads 14B and a further electrically conducting connection 18, 19 between the contact pad 14B and the further contact pad 14C, the contact pads being respectively formed by a wire running in a meandering form. In this case, the second contact pad 14C is however formed by a continuous wire of its own, which forms a connection line 18 leading out of the contact pad 14C, and which however does not lead directly to the first contact pad 14B. Instead, an electrically conducting connecting element 19 is provided such that it overlies a region of the connecting line 16 between the contact pads 4 and 14B and a region of the connection line 18 and connects them to one another.

The connecting element 19 may be a metallic element or a metallized element, for example a piece of copper or a thin copper foil or a metallized plastic film, for example a PVC film, particularly preferably a plastic film coated with copper. It is possible first to apply the connecting element 19 to the inlay layer 11 and then to lay the respective continuous wires over it in the region of the connecting line 16 and connection line 18, or first to lay the wires and then to place the connecting element 19 over the connecting line 16 and connection line 18. The electrical connections between the electrically conducting connecting element 19 and the connecting line 16 and connection line 18 are indicated in FIG. 4 by two ellipses and preferably take place by way of thermocompression welding. The thermocompression welding preferably takes place in an ultrasonically assisted manner, both a plastic sheathing of the wires and any oxide layer of the metallic electrically conducting connecting element 19 being abrasively removed before the elements are finally welded to one another. The exemplary embodiments according to FIGS. 4 and 5 differ only to the extent that the connecting line 16 and the connection line 18 in the exemplary embodiment according to FIG. 5 lie so close together that a single welded connection (indicated in FIG. 5 by only one ellipsis) is enough to connect the two lines 16, 18 to the connecting element 19 in an electrically conducting manner. By contrast, in the exemplary embodiment according to FIG. 4, a separate welded connection is respectively created for the connection of the connecting element 19 to the connecting line 16 on the one hand and to the connection line 18 on the other hand.

In conjunction with the present second aspect, it is preferred to provide the electrically conducting connecting elements 19 for a plurality of chip cards on a correspondingly large-format plastic film, which forms the inlay layer 11, the electrically conducting connecting elements being provided as a metallic coating in certain regions at the corresponding points where an electrically conducting connection between adjacent lines 16, 18 is to be produced. Alternatively, a corresponding number of connecting elements may be laid in prepared cutouts of the full-format sheet, onto which the wires are subsequently laid.

Figure 6A:
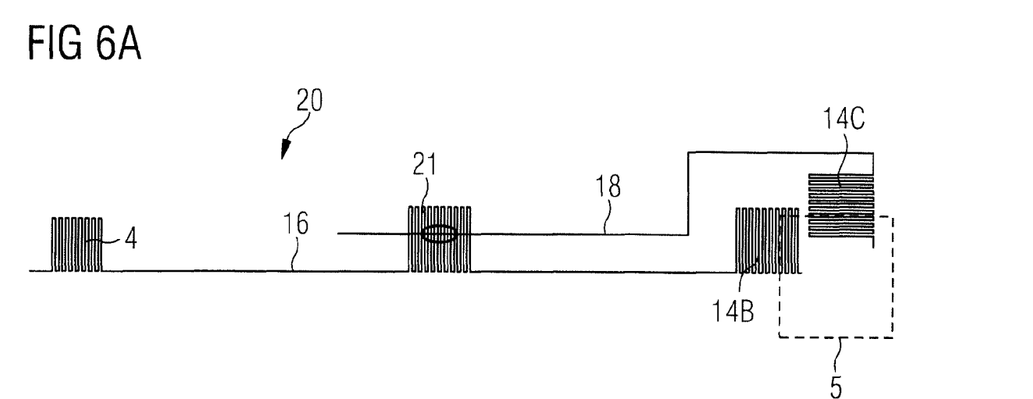
FIGS. 6A and 6B show two wiring layouts according to a third aspect of the present disclosure.

A third aspect of the present disclosure is explained below on the basis of FIGS. 6A and 6B, which respectively show once again schematically in plan view part of a wiring layout 20 created on the inlay layer 11. The solution according to the third aspect is similar to that of the second aspect. Instead however of providing an additional electrically conducting connecting element as a separate component, a fourth wire pad 21 is provided in addition to the terminal pads 4, 14B and 14C formed as wire pads, to be specific as a component part of the connecting line 16. Accordingly, the connecting lines 16 and the associated wire pads 4, 21 and 14B are formed by means of a continuous wire. The connection line 18 leading out of the terminal pad 14C is laid above or below the fourth wire pad 21, depending on which of the two wires is laid first. Subsequently, the electrically conducting connection between the connection line 18 and the fourth wire pad 21 takes place, preferably again by way of thermocompression welding. This is indicated in FIG. 6A by an ellipse. The advantage of this solution over the solution according to the second aspect described above is that no additional material in the sense of a further separate element is required in order to produce the connection between the two wires, so that the thickness of the inlay layer 11 with the wiring layout 20 on it is not increased in comparison with the double meander solution explained at the beginning.

Figure 6B:
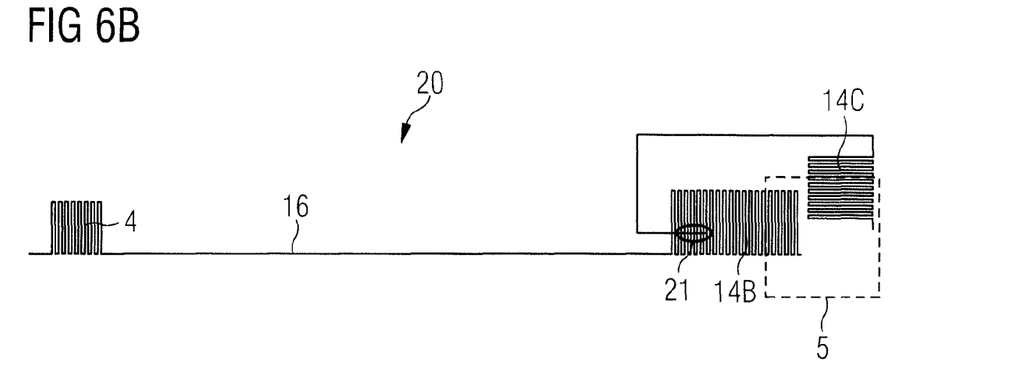

FIG. 6B shows an alternative to the exemplary embodiment from FIG. 6A of such a kind that the additional fourth wire pad 21 is shifted toward the contact pad 14B and preferably forms an enlargement of the contact pad 14B. This enlargement is preferably at least 50% and, as shown in the exemplary embodiment according to FIG. 6B, may be approximately 100%.

Alternatively, but not explicitly shown in the figures, the additional fourth wire pad 21 may be shifted toward the contact pad 4 and preferably form an enlargement of the contact pad 4, so that the contact pad 4 is preferably at least 50%, and in particular for example 100%, larger than one or all of the other contact pads 4 for contacting the first electronic component, or for contacting the chip module 2.

The shifting of the fourth wire pad 21 toward the wire pad 14B or toward the wire pad 4 offers the advantage that its visibility on the surface of the finished chip card is reduced.

Likewise not shown is a further modification of this third aspect of the present disclosure, according to which the fourth wire pad 21 is omitted and the connection line 18 of the contact pad 14C is laid directly over or under the contact pad 14B, or alternatively over or under the contact pad 4. In the first-mentioned case, the two wires are connected to one another in an electrically conducting manner in the region of the contact pad 14B at approximately the same point at which an electrical connection between the contact pad 14B and the contact terminal 17B of the associated second electronic component 15 later also takes place.

Figure 7:
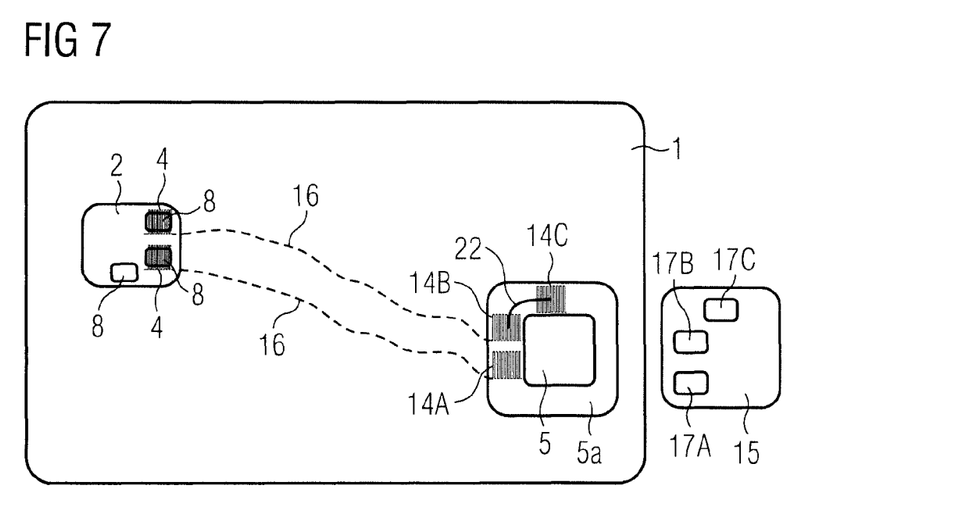
FIG. 7 shows a wiring layout according to a fourth aspect of the present disclosure.

A fourth aspect of the present disclosure is explained below on the basis of FIG. 7, which schematically shows the data carrier 1 in plan view, with a first electronic component inserted in it, here the chip module 2, and a second electronic component 15, which is still to be inserted into the two-stage recess 5 of the card body 1. The small boxes 4 and 17A to 17C shown on the electronic components 2 and 15 represent terminal areas of the relevant electrical components, including the terminal area 17C already mentioned with reference to FIG. 1, which together with a further terminal area 17B of the same electronic component 15 are to be connected in an electrically conducting manner to an associated terminal area 4 of the other electronic component 2 by way of a connecting line 16. As described above, connecting lines 16 run inside the card body 1 on an internal surface of an inlay layer. The two-stage recess 5, including the shoulder region 5a, has been milled out from the card body 1, and in the shoulder region 5a depressions have been milled locally for the case of the connecting technique described in FIG. 2A by means of solder (TeConnect) or conductive elastomer (flexbump), in order to expose the associated contact pads 14A, 14B. If the connecting technique by means of an ACF film is used, the configuration of the depressions is analogous to FIG. 2B. In addition, a further contact pad 14C is exposed. All of the contact pads are wire pads, as described above, and the connecting lines 16 are formed with the respective contact pad 14A and 14B as a continuous wire. The contacting between the contact pads 14A, 14B, 14C on the one hand and the associated contact areas 17A, 17B, 17C of the second electronic component 15 on the other hand may take place for example in flex-bump technology by means of a solder paste (for example TeConnect) or by means of an ACF film, as likewise explained above.

In the case of this fourth aspect of the present disclosure, the contact pads 14B and 14C are connected to one another in an electrically conducting manner in such a way that not only is the solder paste, or in the case of flex-bump technology the electrically conductive plastics compound, applied in the region of the contact pads 14B and 14C, but also in this way an electrically conducting connection 22 is produced directly between the two contact pads 14B and 14C. For this purpose, not only is the shoulder region 5a of the two-stage depression 5 milled away in the region of the contact pads 14B and 14C, but also a connecting channel in between is milled, in which then the solder paste or the electrically conductive plastic is laid along a continuous line, in order in this way to connect the two contact pads 14B and 14C in an electrically conducting manner. The solder paste or the electrically conducting plastic is in this case isotropic with respect to the electrical conductivity.

Figure 8A:
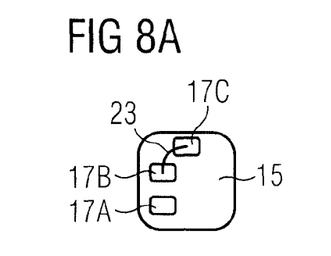
FIGS. 8A and 8B show two alternatives of an electronic component and FIG. 9 shows a chip card produced by means of the component shown in FIG. 8A or 8B.
Figure 8B:
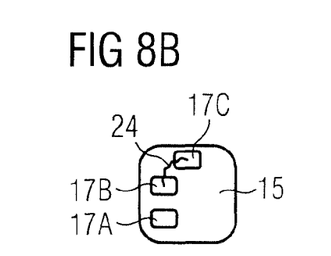
Figure 9:
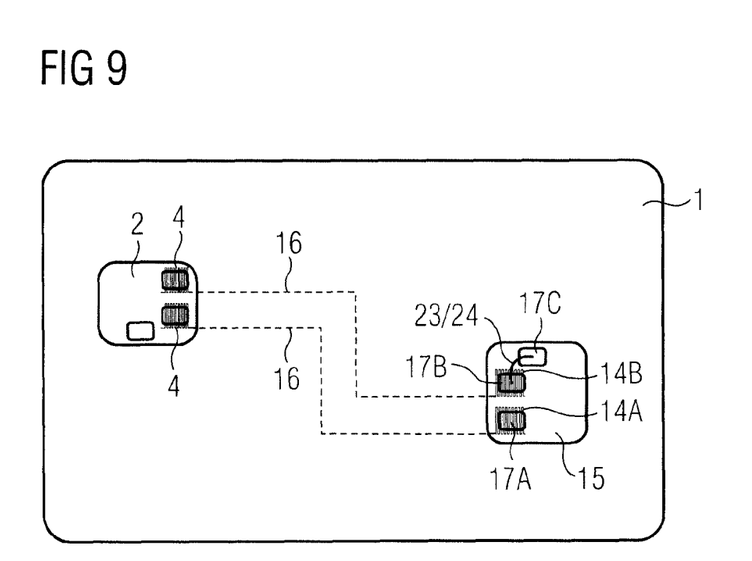

A fifth aspect of the present disclosure is explained below on the basis of FIGS. 8A, 8B and 9. In these, FIGS. 8A and 8B respectively show schematically in plan view from above two exemplary embodiments of the second electronic component 15. This can be inserted into the card body 1 in the same way as explained with reference to FIG. 7 and shown in FIG. 9. The difference from the fourth aspect described above is that the additional contact pad 14C of the wiring layout or the inlay layer can be omitted.

This solution is appropriate for those cards in which the connection between the contact pads of the wiring layout and the contact areas of the electronic components takes place by means of the ACF connection technique. This is so because a lateral electrically conducting connection cannot be produced with ACF films, since it is only conductive in the Z direction, that is to say perpendicularly to the contact pads and contact areas. The material for producing the conductive connection between the two contact areas 17B and 17C of the electronic component 15 in FIG. 8A is a simple, preferably uninsulated wire 23. In the case of the variant according to FIG. 8B, an isotropic conductive paste 24 is provided instead of the wire 23. Conductive paste means all materials that can be applied in whatever way to make possible an electrical connection between two contact pads. It may be for example a solder or a paste filled with metallic particles of any form, similarly carbon or other electrically conductive materials. The conductive paste cures or dries before the electronic component 15 is inserted into the card body 1. Then only a one-to-one wire connection needs to be produced on the card inlay between the respective contact pads 4 and 14A, 14B of the electronic components 2 and 15 to be connected to one another, which are preferably again formed by means of a continuous wire which run in a meandering form in the region of the contact pads.

In the case of all of the aspects of the present disclosure that are described above, it is advisable, by using multiple repeat sheets, to produce a multiplicity of wiring layouts 20, and as a consequence card bodies 1, per multiple-repeat sheet. For this purpose, a corresponding multiplicity of wiring layouts are applied to the multiple-repeat sheet that forms the inlay layer 11 of the card body 1, the wiring layout 20 lying on the internal surface of the inlay layer 11. The data-bearing cards, in particular chip cards, are only broken out from the multiple-repeat sheet right at the end, once all of the layers have been laminated to one another.

The invention claimed is:

1. A wiring layout for a data carrier as a multilayered data-bearing card, comprising at least one first contact pad for connecting a first electronic component and at least two second contact pads for connecting a second electronic component as well as electrically conducting connections on the one hand between the first contact pad and a first of the second contact pads and on the other hand between the first of the second contact pads and a second of the second contact pads, said contact pads being respectively formed by a wire running in a meandering form, wherein a continuous wire, which forms said contact pads and said electrically conducting connections and which is laid in the first of the second contact areas as a double meander, to be precise such that a first part of the continuous wire forms first meander loops arranged in series next to one another in a first direction and an adjoining second part of the continuous wire forms second meander loops arranged in series next to one another in an opposite running-through direction, the first and second meander loops being nested in one another.

2. A semi-finished product for producing a data carrier as a multilayered data-bearing card, comprising a plastic layer with a surface which is intended to lie inside the data-bearing card and which comprises at least one wiring layout according to claim 1.

3. A data carrier as a multilayered data-bearing card, comprising a wiring layout according to claim 1.

4. The data carrier according to claim 3, comprising at least one top layer, which covers the wiring layout and has at least one recess for receiving the first or the second or both electronic components.

5. The data carrier according to claim 4, the at least one recess being a two-stage depression with a shoulder region, which extends over at least one of the contact pads of the wiring layout.

6. The data carrier according to claim 3, comprising a fingerprint sensor as one of the two electronic components and in addition a microchip connected to it in an electrically conducting manner.

7. A wiring layout for a data carrier as a multilayered data-bearing card, comprising at least one first contact pad for connecting a first electronic component and at least two second contact pads for connecting a second electronic component as well as electrically conducting connections on the one hand between the first contact pad and a first of the second contact pads and on the other hand between the first of the second contact pads and a second of the second contact pads, said contact pads being respectively formed by a wire running in a meandering form, wherein a first continuous wire, which forms the at least one first contact pad and the first of the second contact pads as well as a connecting line between these two contact pads, and a second continuous wire, which forms the second of the second contact pads as well as a connection line led out from it, an electrically conducting connecting element overlying a region of the connecting line of the first continuous wire and a region of the connection line of the second continuous wire and connecting them to one another in an electrically conducting manner.

8. The wiring layout according to claim 7, the electrically conducting connecting element being metallic and the electrically conducting connection between the electrically conducting connecting element and the connecting line of the first continuous wire on the one hand and between the electrically conducting connecting element and the connection line of the second continuous wire on the other hand being a welded connection.

9. The wiring layout according to claim 8, the welded connection being a thermocompression welded connection.

10. The wiring layout according to claim 7, the region of the connecting line of the first continuous wire and the region of the connection line of the second continuous wire lying so close together that the electrically conducting connection between the electrically conducting connecting element and the connecting line on the one hand and between the electrically conducting connecting element and the connection line on the other hand is formed as a common connecting point.

11. The wiring layout according to claim 7, the connecting element being a copper element.

12. The wiring layout according to claim 7, the connecting element being a metallized film.

13. A wiring layout for a data carrier as a multilayered data-bearing card, comprising at least one first contact pad for connecting a first electronic component and at least two second contact pads for connecting a second electronic component as well as electrically conducting connections on the one hand between the first contact pad and a first of the second contact pads and on the other hand between the first of the second contact pads and a second of the second contact pads, said contact pads being respectively formed by a wire running in a meandering form,
wherein a first continuous wire, which forms the at least one first contact pad and the first of the second contact pads as well as a connecting line between these two contact pads, and a second continuous wire, which forms the second of the second contact pads as well as a connection line led out from it, the first continuous wire forming an additional meandering contact pad in a region of the connecting line, and the additional meandering contact pad formed by the first continuous wire and the connection line formed by the second continuous wire overlapping one another and being connected to one another in an electrically conducting manner.

14. The wiring layout according to claim 13, the additional meandering contact pad forming an enlargement of the first of the second contact pads or of the at least one first contact pad, so that the first of the second contact pads is larger than the second of the second contact pads or the at least one first contact pad is larger than one other of the first contact pads.

15. The wiring layout according to claim 14, the first of the second contact pads being at least 50% larger than the second of the second contact pads or the at least one first contact pad being at least 50% larger than the other of the first contact pads.

16. The wiring layout according to claim 14, the enlargement of the first of the second contact pads formed by the additional meandering contact pad extending in a direction away from an attachment location of the second electronic component.

17. The wiring layout according to claim 13, the electrically conducting connection of the connection line to the additional meandering contact pad being a thermocompression welded connection.

18. A wiring layout for a data carrier as a multilayered data-bearing card, comprising at least one first contact pad for connecting a first electronic component and at least two second contact pads for connecting a second electronic component as well as electrically conducting connections on the one hand between the first contact pad and a first of the second contact pads and on the other hand between the first of the second contact pads and a second of the second contact pads, said contact pads being respectively formed by a wire running in a meandering form,
wherein a first continuous wire, which forms the at least one first contact pad and the first of the second contact pads as well as a connecting line between these two contact pads, and a second continuous wire, which forms the second of the second contact pads as well as a connection line led out from it, either the at least one first contact pad or the first of the second contact pads on the one hand and the connection line formed by the second continuous wire on the other hand overlapping one another and being connected to one another in an electrically conducting manner.

19. The wiring layout according to claim 18, the electrically conducting connection of the connection line to the at least one first contact pad or the first of the second contact pads being a thermocompression welded connection.

20. A wiring layout for a data carrier as a multilayered data-bearing card, comprising at least one first contact pad for connecting a first electronic component and at least two second contact pads for connecting a second electronic component as well as electrically conducting connections on the one hand between the first contact pad and a first of the second contact pads and on the other hand between the first of the second contact pads and a second of the second contact pads, said contact pads being respectively formed by a wire running in a meandering form,
wherein the electrically conducting connection between the first and the second of the second contact pads is produced by a line of an electrically conducting solder material directly connecting these two contact pads.

21. A semi-finished product for producing a data carrier as a multilayered data-bearing card, comprising a first electronic component and a second electronic component as well as a plastic layer with a surface which is intended to lie inside the data-bearing card and which comprises at least one wiring layout, the wiring layout comprising at least one first contact pad for connecting the first electronic component and at least one second contact pad for connecting the second electronic component as well as an electrically conducting connection between the first contact pad and the second contact pad, said contact pads being respectively formed by a wire running in a meandering form and the second electronic component having at least two contact areas,
wherein the electrically conducting connection between the two contact areas of the second electronic component is produced by means of an electrically conducting material, which has been applied to the two contact areas and connects them directly to one another.

22. The semi-finished product according to claim 21, the electrically conducting material that directly connects the two contact areas of the second electronic component being an uninsulated wire.

23. The semi-finished product according to claim 21, the electrically conducting material that directly connects the two contact areas of the second electronic component being a line of isotropic conductive paste.

24. The semi-finished product according to claim 21, comprising at least one further second contact pad for connecting the second electronic component, an anisotropic conductive film for producing an electrically conducting connection to two corresponding contact areas of the second electronic component being provided on the at least two second contact pads, perpendicularly to the second contact pads.

25. The semi-finished product according to claim 21, the semi-finished product being a multi-repeat sheet which has a plurality of the wiring layouts.

26. A method for producing a wiring layout for a data carrier as a multilayered data-bearing card, comprising the following steps:
providing a plastic substrate and
laying a continuous wire on the plastic substrate to create at least one first contact pad for connecting a first electronic component and at least two second contact pads for connecting a second electronic component, the wire being laid in said contact pads in a meandering form in each case, and to create an electrically conducting connection between the first contact pad and a first of the second contact pads on the one hand and between the first of the second contact pads and a second of the second contact pads on the other hand, the continuous wire being laid in the first of the second contact areas as a double meander, to be specific such that a first part of the continuous wire forms first meander loops arranged in series next to one another in a first direction and an adjoining part of the continuous wire forms second meander loops arranged in series next to one another in an opposite running-through direction, the first and second meander loops being nested in one another.

27. The method according to claim 26, the plastic film forming a multiple-repeat sheet on which a plurality of the first contact pads and the second contact pads are created for a multiplicity of wiring layouts.

28. A method for producing a data carrier as a multilayered data-bearing card, or a semi-finished product for such a data carrier, a wiring layout being produced according to a method according to claim 26 an internal surface of a layer of the data carrier.

29. A method for producing a wiring layout for a data carrier as a multilayered data-bearing card, comprising the following steps:
providing a plastic substrate,
laying a first continuous wire on the plastic substrate to create at least one first contact pad for connecting a first electronic component and a first of at least two second contact pads for connecting a second electronic component and to create a connecting line between these two contact pads, the first continuous wire being laid in said contact pads in a meandering form in each case,
laying a second continuous wire on the plastic substrate to create a second of the second contact pads and a connection line leading out of it, the second continuous wire being laid in the second of the second contact pads in a meandering form,
applying an electrically conducting connecting element either in such a way that it covers both a region of the connecting line of the first continuous wire and a region of the connection line of the second continuous wire or in such a way that both the laying of the first continuous wire in the region of the connecting line and the laying of the second continuous wire in the region of the connection line take place after applying the electrically conducting connecting element and respectively over the electrically conducting connecting element, and
connecting the electrically conducting connecting element in an electrically conducting manner both to the first continuous wire in the region of the connecting line and to the second continuous wire in the region of the connection line.

30. The method according to claim 29, the connecting line and the connection line being laid so close together in the region of the electrically conducting connecting element that the electrically conducting connecting between the electrically conducting connecting element and the connecting line on the one hand and between the electrically conducting connecting element and the connection line on the other hand is formed as a common connecting point.

31. The method according to claim 30, the step of connecting in an electrically conducting manner taking place by thermocompression welding.

32. A method for producing a wiring layout for a data carrier as a multilayered data-bearing card, comprising the following steps:
providing a plastic substrate,
laying a first continuous wire on the plastic substrate to create at least one first contact pad for connecting a first electronic component and a first of at least two second contact pads for connecting a second electronic component and to create a connecting line between these two contact pads, the first continuous wire being laid in said contact pads in a meandering form in each case and forming an additional meandering contact pad in a region of the connecting line,
laying a second continuous wire on the plastic substrate to create a second of the second contact pads and a connection line leading out of it, the second continuous wire being laid in the second of the second contact pads in a meandering form, and the first and the second continuous wire being laid such that the connection line formed by the second continuous wire and the additional meandering contact pad formed by the first continuous wire overlap one another, and
connecting the connection line formed by the second continuous wire and the additional meandering contact pad formed by the first continuous wire in an electrically conducting manner in an overlapping region.

33. The method according to claim 32, the additional meandering contact pad being formed as an enlargement of the first of the second contact pads or of the at least one first contact pad, so that the first of the second contact pads is larger than the second of the second contact pads or the at least one first contact pad is larger than one other of the first contact pads, the first of the second contact pads being formed 50% larger than the second of the second contact pads or the at least one first contact pad being formed at least 50% larger than the other of the first contact pads.

34. The method according to claim 33, the enlargement of the first of the second contact pads formed by the additional meandering contact pad extending in a direction away from an attachment location of the second electronic component.

35. A method for producing a wiring layout for a data carrier as a multilayered data-bearing card, comprising the following steps:
providing a plastic substrate, laying a first continuous wire on the plastic substrate to create at least one first contact pad for connecting a first electronic component and a first of at least two second contact pads for connecting a second electronic component and to create a connecting line between these two contact pads, the first continuous wire being laid in said contact pads in a meandering form in each case, laying a second continuous wire on the plastic substrate to create a second of the second contact pads and a connection line leading out of it, the second continuous wire being laid in the second of the second contact pads in a meandering form, and the first and the second continuous wire being laid such that the connection line formed by the second continuous wire on the one hand and either the at least one first contact pad formed by the first continuous wire or the first of the second contact pads formed by the first continuous wire on the other hand overlap one another, and connecting the connection line formed by the second continuous wire and the contact pad overlapping it in an electrically conducting manner in an overlapping region.

36. The method according to claim 35, the step of connecting in an electrically conducting manner taking place by thermocompression welding.

37. A method for producing a wiring layout for a data carrier as a multilayered data-bearing card, comprising the following steps:

providing a plastic substrate, laying a first continuous wire on the plastic substrate to create at least one first contact pad for connecting a first electronic component and a first of at least two second contact pads for connecting a second electronic component and to create a connecting line between these two contact pads, the first continuous wire being laid in said contact pads in a meandering form in each case, laying a second continuous wire on the plastic substrate to create a second of the second contact pads, the second continuous wire being laid in the second of the second contact pads in a meandering form, creating an electrically conducting connection between the first of the second contact pads and the second of the second contact pads, in that a line of an electrically conducting solder material, directly connecting these two contact pads is applied.

38. A method for producing a semi-finished product for a data carrier as a multilayered data-bearing card, comprising the steps of:

providing a plastic substrate, laying a continuous wire on the plastic substrate to create at least one first contact pad for connecting a first electronic component and a second contact pad for connecting a second electronic component and to create a connecting line between these two contact pads, the continuous wire being laid in said contact pads in a meandering form in each case, and the second electronic component having at least two contact areas, and creating an electrically conducting connection between the two contact areas of the second electronic component by applying to the two contact areas of the second electronic component an electrically conducting material, which connects them directly to one another.

39. The method according to claim 38, the electrically conducting material that directly connects the two contact areas of the second electronic component being an uninsulated wire.

40. The method according to claim 38, the electrically conducting material that directly connects the two contact areas of the second electronic component being a line of isotropic conductive paste.

41. The method according to claim 38, at least one further second contact pad for connecting the second electronic component being provided on the plastic substrate, comprising the further step of applying an anisotropic conductive film to the at least two second contact pads for producing an electrically conducting connection, formed perpendicularly to the second contact pads, to two corresponding contact areas of the second electronic component.

\* \* \* \* \*